United States Patent
Lisy et al.

[11] Patent Number: 6,105,904
[45] Date of Patent: Aug. 22, 2000

[54] DEPLOYABLE FLOW CONTROL DEVICE

[75] Inventors: Frederick J. Lisy, Euclid; Robert N. Schmidt, Cleveland, both of Ohio

[73] Assignee: Orbital Research Inc., Cleveland, Ohio

[21] Appl. No.: 09/050,303

[22] Filed: Mar. 30, 1998

[51] Int. Cl.[7] ................................................. B64C 23/06
[52] U.S. Cl. .................... 244/199; 244/204; 244/130; 92/101
[58] Field of Search ..................... 244/198, 199, 244/204, 201, 130; 92/60, 135 D, 101, 99

[56] References Cited

U.S. PATENT DOCUMENTS

| | | | |
|---|---|---|---|
| 1,549,072 | 8/1925 | Dole, Sr. et al. ........................ | 92/102 |
| 2,546,403 | 3/1951 | Pendelton ................................ | 92/101 |
| 2,612,419 | 9/1952 | Reynolds ................................. | 92/101 |
| 2,942,624 | 6/1960 | Good ...................................... | 92/101 |
| 2,951,662 | 9/1960 | Theodorsen ............................. | 244/12 |
| 3,498,248 | 3/1970 | Van Bibber ............................. | 244/213 |
| 3,586,267 | 6/1971 | Ingelman-Sundberg ................ | 244/42 |
| 4,017,041 | 4/1977 | Nelson .................................... | 244/40 |
| 4,039,161 | 8/1977 | Bauer ..................................... | 244/213 |
| 5,209,438 | 5/1993 | Wygnanski .............................. | 244/199 |
| 5,755,408 | 5/1998 | Schmidt et al. ......................... | 244/199 |

FOREIGN PATENT DOCUMENTS 4-103495  4/1992  Japan ..................... 244/199

Primary Examiner—Galen L. Barefoot

[57] ABSTRACT

A deployable flow control device for a flow surface over which fluid having a fluid boundary layer flows which fluid boundary layer exhibits certain dynamics is disclosed. The deployable flow control device comprises a flow effector which is movably attached to a housing which is attachable, either initially or retrofitably, to a flow surface. The flow effector can position in a modular sub-housing removably attachable to the housing. The flow effector is deployed into and retracted out of the boundary layer on the flow surface and thereby controls the boundary layer dynamics. Devices (including devices utilizing a sealable, flexible element) operably connect to the flow effector and deploy and retract it. The sealable, flexible element has two elastic states defined as quiescent and deformed such that, when the sealable, flexible element is utilized, the flow effector is deployed into and retracted out of the fluid boundary layer based upon the elastic state of the sealable, flexible element.

23 Claims, 6 Drawing Sheets

DEPLOYABLE FLOW CONTROL DEVICE

STATEMENT REGARDING FEDERALLY SPONSORED RESEARCH OR DEVELOPMENT

This invention was made with Government support under Contract No. F33615-96-C-3010 awarded by the U.S. Department of Defense (Air Force). The Government has certain rights in the invention.

BACKGROUND OF THE INVENTION

1. Field of the Invention

This invention relates generally to deployable flow control devices for flow surfaces and, more particularly, to deployable flow control devices for flow surfaces which are fast acting with throws sufficient to affect flow surface dynamics and robust enough to withstand the rigors of operating environments.

2. Description of Related Art

Military aircraft sometimes experience severe and drastic problems involving sudden and uncontrollable loss of aerodynamics during certain maneuvers, especially combat maneuvers. This loss of aerodynamics typically relates to two major factors, wing stall and forebody flow asymmetries. These two factors can occur when the flow surface is at high angles of attack, which happens during take-off and landing and during high speed maneuvers. This loss of aerodynamics compromises the effectiveness of the aircraft and can contribute to damage to the aircraft and injury or even death of the pilot. These experiences have been widely reported in the media and have gained world-wide attention.

As fluid flows over a flow surface, like air over an airplane wing or nose cone, air over turbine engine blades, or water around a ship or submarine, it forms a fluid boundary layer at the flow surface. The fluid boundary layer is a thin layer of viscous flow having laminar characteristics and exhibiting certain dynamics affecting the operation of the flow surface. A free stream of fluid flows above the fluid boundary layer. At a point along the flow surface the fluid boundary layer separates from the flow surface. In the case of a wing, if the separation is too near the leading edge, the wing stalls and the aircraft looses lift and the pilot looses control. In the case of the nose cone, flow separation occurs asymmetrically on the surface of the nose cone. Once asymmetric flow separation occurs, asymmetric vortices result and often generate large pressure differences across the nose which result in large side forces. These side forces decrease control and maneuverability.

Flow control devices have been employed to control fluid boundary layer dynamics and counteract the boundary layer separation point. These devices can be categorized as active or passive. Active devices, such as adjustable flaps and rudders, actually change the shape of the flow surface. Passive devices, such as vortex generators, tapered fins, scoops, flow-jet injectors and minidomes, protrude into or through the fluid boundary layer and enhance the mixing of the fluid on the flow surface and thereby, control fluid boundary layer dynamics.

Boundary layer separation occurs during certain situations of fluid flow. The presence of a device protruding from the flow surface when boundary layer separation is not occurring produces a drag on the flow surface resulting in increased fuel consumption and reduced efficiency of the craft. Also, with respect to military aircraft, protruding passive flow control devices can produce a radar signature compromising the stealth capability of the aircraft. Therefore, the device should be capable of being removed from the flow surface when not needed, especially in stealth required regimes.

Also, the dynamic benefit to be gained from the device must more than offset its overall weight and power requirements (including the weight and power requirements of its peripheral equipment) and should be retrofitable to flow surfaces of craft already in operation.

Accordingly, a need exists for a deployable flow control device to control fluid boundary layer dynamics that can be dependably and repeatedly deployed and retracted, be small and light weight have sufficient throw to affect the boundary layer flow for all operating conditions, and be robust enough to withstand the harsh environment on the flow surface. The device should also be economically retrofitable to craft already in operation.

BRIEF SUMMARY OF THE INVENTION

The present invention provides a device to satisfy the aforementioned need.

Accordingly, the present invention relates to a deployable flow control device for use with a flow surface over which fluid forming a fluid boundary layer flows and which fluid boundary layer exhibits certain dynamics. The deployable flow control device comprises a flow effector and a sealable, flexible element. The sealable, flexible element has two elastic states defined as quiescent and deformed and is operably connected to the flow effector such that the flow effector is deployed into and retracted out of the fluid boundary layer flowing over the flow surface based upon the elastic state of the sealable, flexible element. The flow effector thereby controls the fluid boundary layer dynamics. The sealable, flexible element can be made from a polymer.

In another aspect, the present invention relates to a deployable flow control device for a flow surface over which fluid having a fluid boundary layer flows and which fluid boundary layer exhibits certain dynamics. The deployable flow control device comprises a pressure source, a sealable, flexible element, biasing means and a flow effector. The sealable, flexible element has two elastic states, defined as quiescent and deformed, and is connected to the pressure source such that when pressure from the pressure source is applied to the sealable, flexible element the sealable, flexible element changes to the deformed state. The biasing means urges the sealable, flexible element to the quiescent state when pressure is removed from the sealable, flexible element. The flow effector is operably connected to the sealable flexible element such that the flow effector is deployed into and retracted out of the fluid boundary layer flowing over the flow surface based upon the elastic state of sealable, flexible element. The flow effector thereby controls the boundary layer dynamics. The pressure source can be air bled from an aircraft turbine engine, a pressurized gas cartridge or other pressure source. The biasing means can be spring means, vacuum means or pressure means. A weather proof cover can cover the flow effector protecting it from rain and snow.

In yet another aspect, the present invention relates to a deployable flow control device for use with a flow surface over which fluid having a fluid boundary layer flows which fluid boundary layer exhibits certain dynamics. The deployable flow control device comprises a housing attachable to the flow surface, a flow effector movably attached to the housing and deploying and retracting means operably connected to the flow effector. The deploying and retracting means deploys and retracts the flow effector, from the housing, into and out of the fluid boundary layer flowing over the flow surface. The flow effector thereby controls the fluid boundary layer dynamics. The housing can be retrofitably attachable to the flow surface while the flow effector can be positioned in a modular sub-housing which is removably attached to the housing. The deploying and retracting means can include a sealable, flexible element, pneumatic pressure, hydraulic pressure, a microelectromechanical device, a mechanical device or a combination of these.

In yet another aspect, the present invention relates to a deployable flow control device for a flow surface over which fluid having a fluid boundary layer flows which boundary layer exhibits certain dynamics. The deployable flow control device comprises a pressure source and a sealable, flexible element having two elastic states, defined as quiescent and deformed, connected to the pressure source. When pressure from the pressure source is applied to the sealable, flexible element, the sealable, flexible element changes to the deformed state whereby it deploys into the fluid boundary layer on the flow surface. The sealable, flexible element thereby controls the fluid boundary layer dynamics.

BRIEF DESCRIPTION OF THE SEVERAL VIEWS OF THE DRAWINGS

Further features of the present invention will become apparent to those skilled in the art to which the present invention relates from reading the following specification with reference to the accompanying drawings in which.

DETAILED DESCRIPTION OF THE INVENTION

Figure 1:
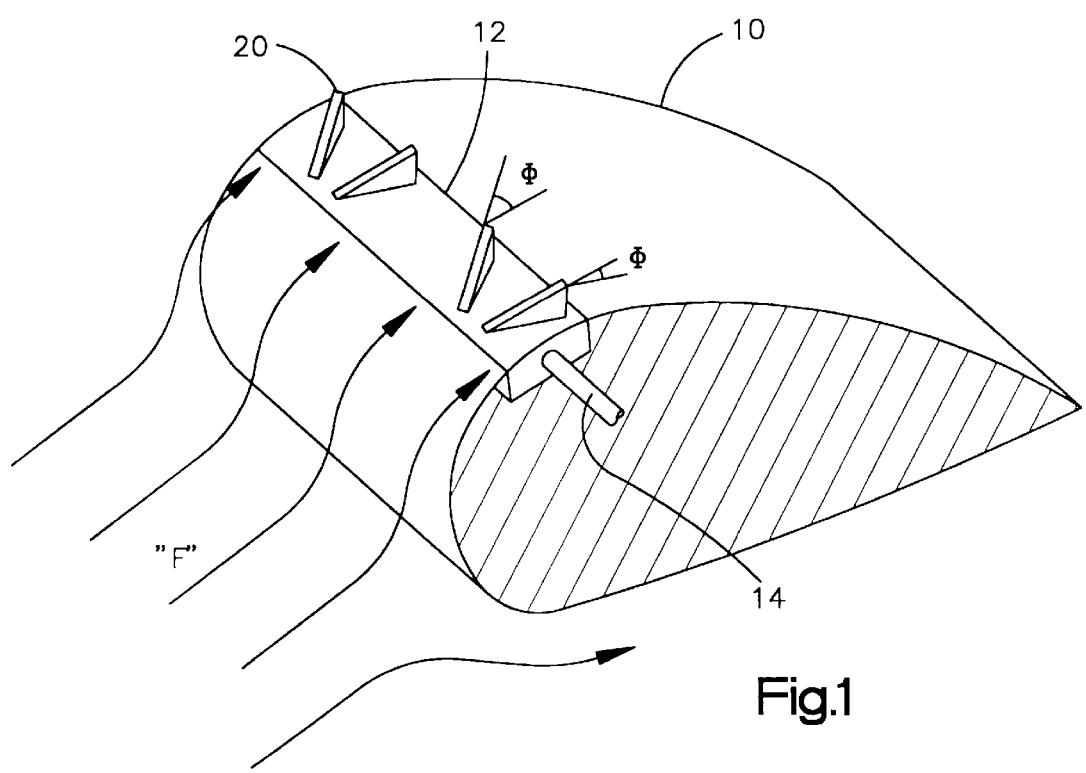
FIG. 1 is a perspective view of a section of a flow surface showing fluid flowing thereover and deployed flow effectors mounted therein.

Referring now to FIG. 1, there is shown a perspective view of a section of a flow surface 10 over which fluid "F" flows forming a fluid boundary layer. The fluid boundary layer is a thin layer of viscous flow having laminar characteristics occurring at the flow surface 10 and exhibiting certain dynamics. The fluid "F" may be any fluid such as air, water, etc. The flow surface 10 can be any flow surface including an aircraft wing or nose cone, ship hull or the surfaces of a turbine engine. At certain conditions, like a high angle of attack of the flow surface 10, the fluid boundary layer is susceptible to boundary layer separation. Boundary layer separation is caused by a combination of the viscous forces within the fluid boundary layer and an adverse pressure gradient over the flow surface 10. Flow effectors 20 are used to control fluid boundary layer dynamics. Controlling fluid boundary layer dynamics not only provides an overall benefit to the operation of the flow surface but also counteracts and controls fluid boundary layer separation.

In FIG. 1, a flow effector 20 is movably attached to housing 12 such that deploying and retracting means 14 deploys and retracts the flow effector 20 from the housing 12 into and out of the fluid boundary layer when needed. In FIG. 1 a flow effector 20 is shown deployed into the fluid boundary layer. When retracted, flow effector 20 may or may not be flush with the flow surface 10. In FIG. 1 the flow effector 20 is shown as a plurality of paired counter-rotating vortex generators. The vortex generators are cut on a bias into the direction of the flow of the fluid "F". Also the vortex generator is shown oriented at an angle "Ø" of between about 5 to 45 degrees to the direction of the flow of the fluid "F". The paired arrangement creates counter-rotating vortices on the flow surface 10.

Although the flow effector 20 is shown as vortex generators with a particular shape and configuration, any shape or configuration of flow effector 20, can be employed, including co-rotating vortex generators, turbulence producers, and vortex manipulators, like strakes. Also, although in FIG. 1 a wing is shown, the flow effector 20 can be utilized with any flow surface 10, including a nose cone, turbine engine or hull of a ship. The deploying and retracting means 14 can be or include any means or device such as pneumatic pressure, hydraulic pressure, vacuum, a mechanical device, a microelectromechanical device, or a combination thereof.

Figure 2:
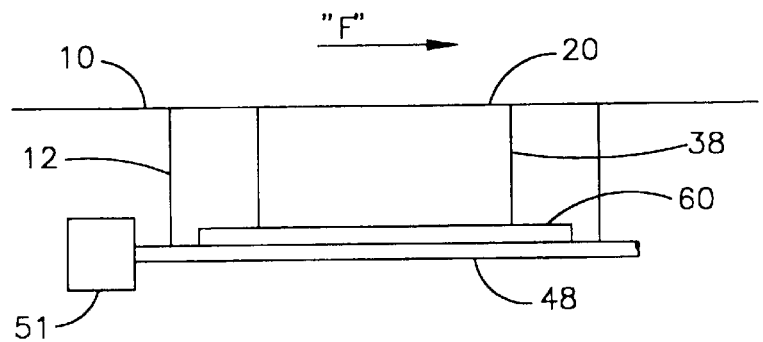
FIG. 2 is a schematic view of a flow effector retracted out of the fluid boundary layer of fluid flowing over a flow surface.
Figure 3:
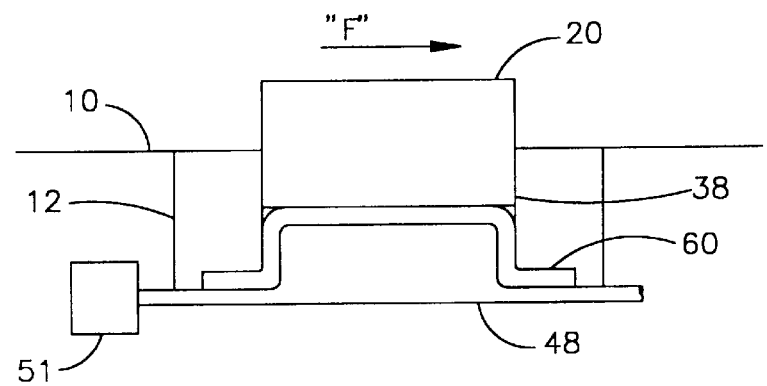
FIG. 3 is a schematic view of a flow effector deployed into the fluid boundary layer of fluid flowing over a flow surface.

Referring now to FIG. 2 and FIG. 3, there are shown schematic views of the flow effector 20 retracted and deployed, respectively. The flow effector 20 is movably attached to the housing 12 by being positioned in chamber 38. The deploying and retracting means 14 includes a sealable, flexible element 60 and a pressure source 51. The sealable, flexible element 60, has two elastic states, defined as quiescent and deformed, and is operably connected to the flow effector 20. The sealable, flexible element 60 is connected to a pressure source 51 by plenum 48. When the plenum 48, is not pressurized the sealable, flexible element 60 is in its quiescent state as shown in FIG. 2. When the plenum 48 becomes pressurized the sealable, flexible element 60 changes to its deformed state. The amount of deformation is determined by the amount of pressurization. As it changes to its deformed state, the sealable, flexible element 60 deploys the flow effector 20 into the fluid boundary layer on the flow surface 10. In its deformed state the sealable, flexible element 60 seals against the chamber 38 walls assuring against the unintentional venting of pressure through the chamber 38. Some leakage, either through an intentionally designed leak or through damage to the sealable, flexible element 60, can be tolerated without severely compromising the effectiveness of the deployable flow control device. This, also, provides for a secure positioning of the flow effector 60 in the chamber 38 and enables repeated and rapid operation without the flow effector 60 binding or jamming. When pressure is removed from the sealable, flexible element 60, the sealable, flexible element 60, because of its elastic properties, returns to its quiescent state retracting the flow effector 60 out of the fluid boundary layer on the flow surface 10. When retracted the flow effector 60 is not exposed to the environment on the flow surface 10. Alternately, pressure may be applied to the sealable, flexible element 60 such that when the sealable, flexible element 60 is in its quiescent state the flow effector 20 is deployed and when it is in its deformed state the flow effector 20 is retracted. The pressure may be positive or negative (vacuum) pressure. Also, a solenoid valve (not shown) can be utilized with the pressure source 51 to enable the pressurization and depressurization of the plenum 48. The flow effector 20 is deployed into and retracted out of the fluid boundary layer on the flow surface 10 based on the elastic state of the sealable, flexible element 60.

Since the amount of pressure determines the extent of deformation of the sealable, flexible element 60, and, accordingly, the extent of the deployment (the amount of throw) of the flow effector 20 on the flow surface 10, the flow effector 20 can be fully deployed, partially deployed or retracted with partial deployment being any amount of deployment between retracted and fully deployed. This enables sensitive and effective control of the flow surface 10 dynamics for all operating conditions and regimes using a flow effector 20 with sufficient throw and a very small pressure source 51 which limits the cost and weight of the peripheral equipment, two major factors determining the economic feasibility of flow control devices.

The sealable, flexible element 60 can be made of a single polymer or a combination of polymers. The pressure source can be air bled from an aircraft turbine engine, when the flow surface 10 is the wing or nose cone of an aircraft with a turbine engine, a pressurized gas cartridge, a pressurized sample of the fluid flowing over the flow surface or any other pressure source. Biasing means can also be employed to urge the sealable, flexible element 60 toward its quiescent state after pressure is removed or reduced. The biasing means may be any device or means like spring means, vacuum or pressure, mechanical or electromechanical devices. Also, the dynamic pressure on the flow surface 10 can be utilized as a biasing means.

Figure 4:
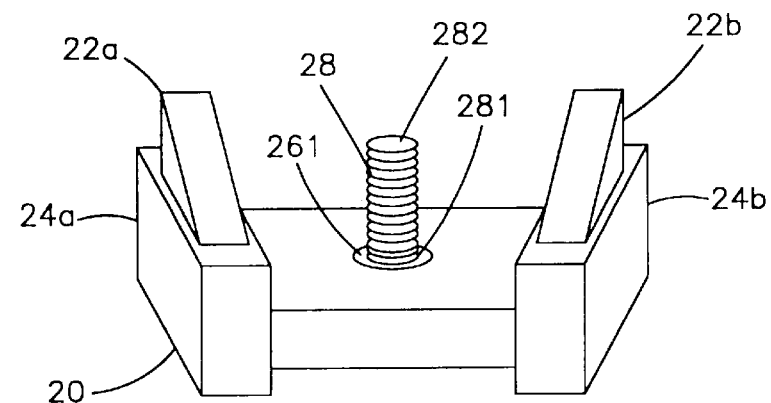
FIG. 4 is a perspective view of a counter-rotating vortex generator type flow effector.
Figure 5:
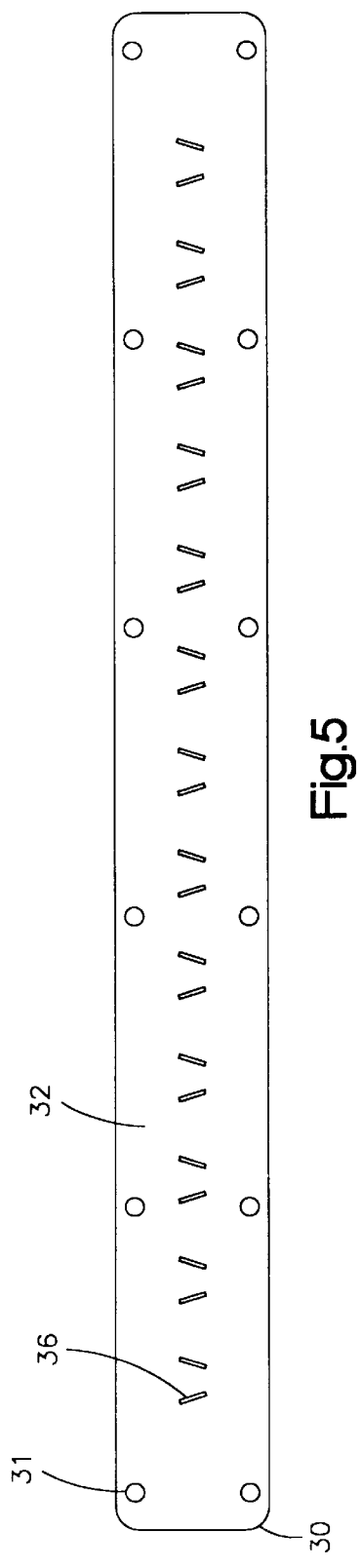
FIG. 5 is a top plan view of the base plate of the housing.
Figure 6:
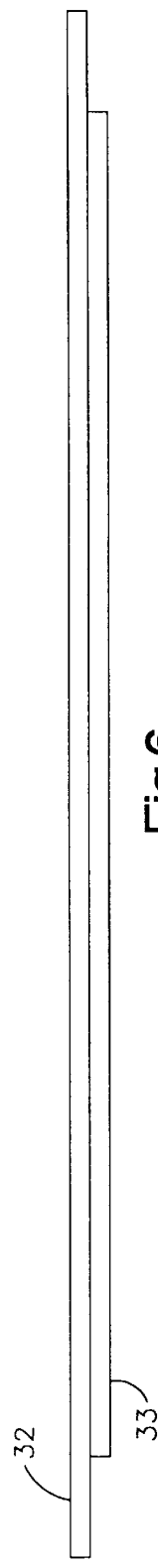
FIG. 6 is an elevation view of the base plate of the housing.
Figure 7:
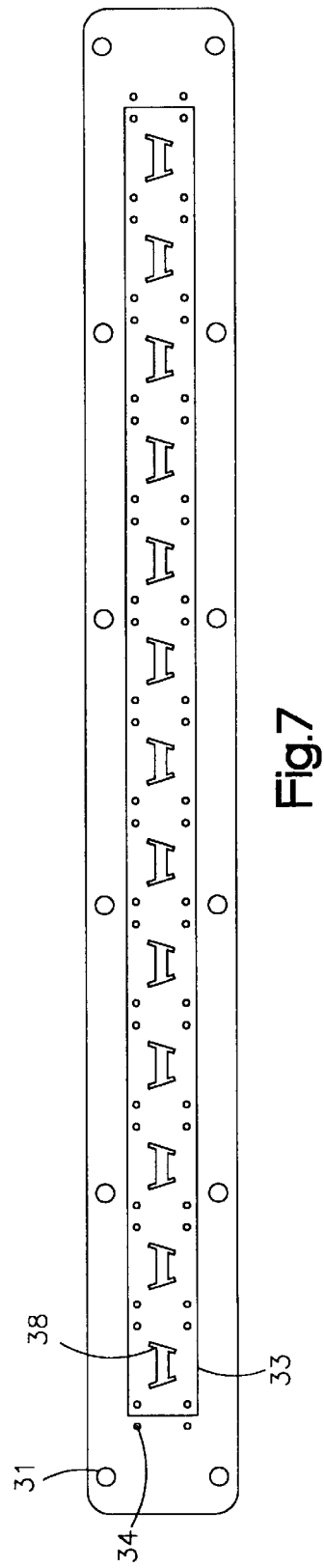
FIG. 7 is a bottom plan view of the base plate of the housing.

Referring now to FIG. 4, there is shown in perspective view a particular design of a flow effector 20. In FIG. 4 the flow effector 20 has counter-rotating vortex generators 22a, 22b each mounted in a block 24a, 24b. The blocks 24a, 24b are connected by the base 26. Biasing means 28 is attached to the base 26 and extends therefrom. The biasing means first end 281 seats in an indent 261 of the base 26. Alternatively, and although not shown on FIG. 4, the biasing means second end 282 may seat in an indent (not shown) in the flow surface face 32. Although, shown as a pair of counter-rotating vortex generators, any type or structure of flow effector 20, like a single pin mounted on the block with a base, can be utilized.

Referring now to FIG.'s 5, 6 and 7 there are shown a top plan view, an elevation view, and a bottom plan view, respectively, of the base plate 30 of the housing 12. Base plate 30 has a flow surface face 32 having apertures 36 opening therefrom. Base attachment holes 34 open to the base attachment face 33 to allow connection to the plenum section 40 (not shown). The apertures 36 provide an opening from the flow surface face 32 to a chamber 38 formed in the base plate 30. The flow effector 20 (not shown) positions in the chamber 38 and slides therein enabling it to deploy through the apertures 36 into the fluid boundary layer. The chamber 38 opens to the base attachment face 33.

Figure 8:
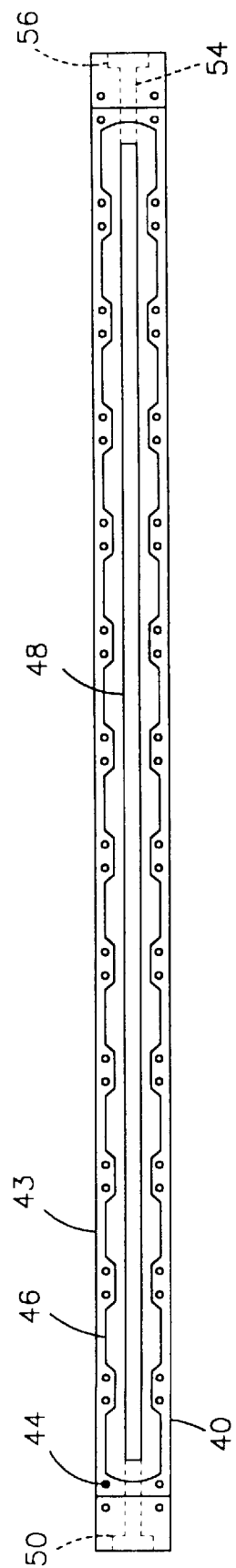
FIG. 8 is a top plan view of the plenum section of the housing.
Figure 9:
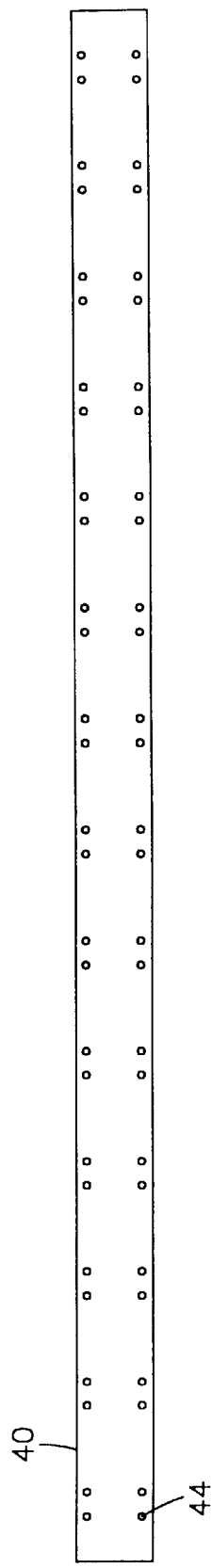
FIG. 9 is a bottom plan view of the plenum section of the housing.

Referring now to FIG. 8 and 9, there is shown a top plan view and a bottom plan view, respectively, of the plenum section 40 of the housing 12. The plenum section 40 has a plenum attachment face 43 and plenum attachment holes 44 which align with base attachment holes 34 when the housing is assembled. Attachment bolts (not shown) locate in the plenum attachment holes 44 and base attachment holes 34 to attach the plenum section 40 to the base plate 30. Plenum 48 extends laterally through the plenum section 40 and opens to the plenum attachment face 43 at each chamber 38 (not shown) location in the base plate 30. Sealing ring 46 seats on the plenum attachment face 43 to provide an air tight seal between the plenum section 40 and the base plate 30 when the housing 12 is assembled. An external pressure source 51 (not shown on FIG.'s 8 and 9) supplies pressure to inlet port 50 which connects to plenum 48. Plenum 48 connects to outlet port 56 through outlet orifice 54. The outlet orifice 54 enables the plenum 48 to depressurize. The plenum 48 can be depressurized in other ways, for example by using an external 3-way solenoid valve in conjunction with the pressure source 51. When an external 3-way solenoid or other depressurizing device is used, the outlet orifice 54 is not required and outlet port 56, alternatively, may be connected to the inlet port 50 of another housing 12 mounted in series, or outlet port 56 can be plugged.

Referring again to FIG.'s 5, 6 and 7, flow surface attachment holes 31 enable the housing 12 to be retrofitably attachable to the flow surface 10 by bolting the housing 12 to the flow surface 10. The housing 12 thereby can be mounted on aircraft already in use without extensive cost and down time. The housing 12 is installed in the wing such that the flow surface face 32 is flush with the flow surface 10 (i.e., the top or bottom of a wing surface) of the aircraft. However, the housing 12 may be integrated into the design of the flow surface 10, also.

Figure 10:
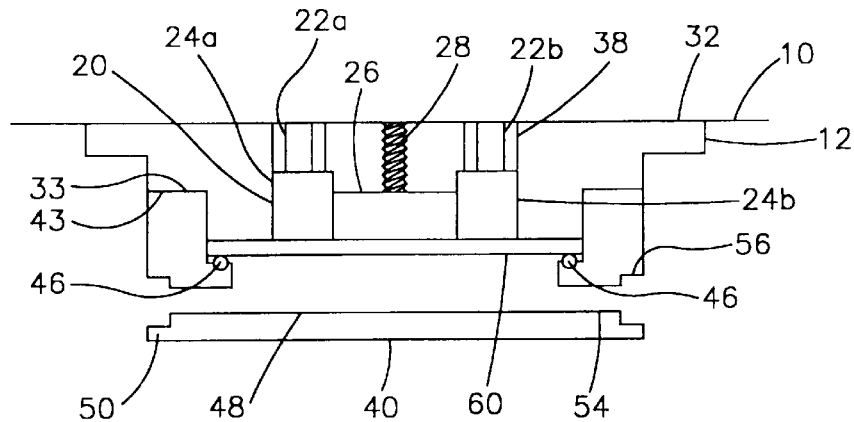
FIG. 10 is a detail, partial cut-away view of a flow effector located in the housing shown retracted out of the fluid boundary layer.
Figure 11:
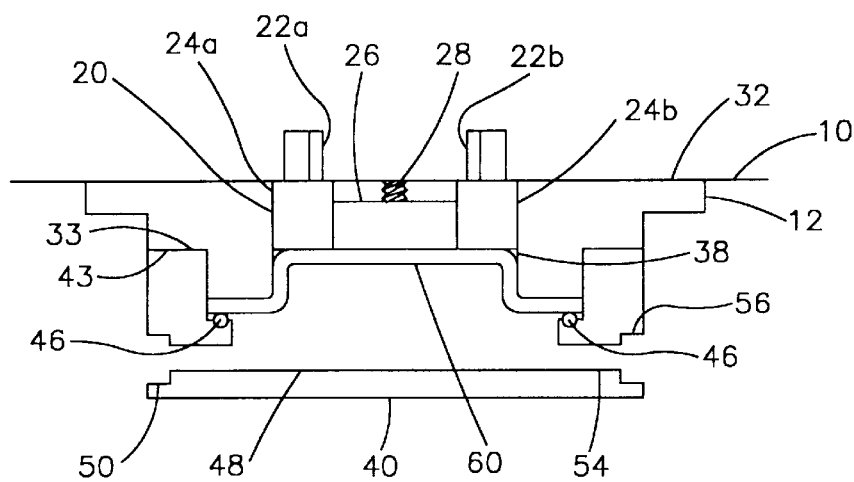
FIG. 11 is a detail, partial cut-away view of a flow effector located in the housing shown deployed into the fluid boundary layer.

Referring now to FIG.'s 10 and 11, there is shown a detail, partial cut-away view of an embodiment of a flow effector 20 movably attached to the housing 12 described in FIG.'s 5, through 9. In FIG. 10 the flow effector 20 is shown retracted while in FIG. 11 it is shown deployed. The base attachment face 33 of the base plate 30 mates with the plenum attachment face 43 of the plenum section 40 with the sealing ring 46 and sealable, flexible element 60 therebetween. The flow effector 20, is shown as having counter-rotating vortex generators 22a, 22b attached to blocks 24a, 24b connected by a base 26. Biasing means 28 (shown as spring means) attaches to the base 26, at biasing means first end 281, and to the inside surface of the base plate 30 at biasing means second end 282. The flow effector 20 positions in the chamber 38. In FIG. 9, no pressure is being applied to the inlet port 50, the plenum 48 is not pressurized, and the scalable flexible element 60 is in its quiescent state with the flow effector 20 retracted out of the fluid boundary layer. In FIG. 11 the flow effector 20 is shown deployed into the fluid boundary layer. This is achieved by applying pressure at inlet port 50 which pressurizes plenum 48. The plenum 48 is a transmitting means for transmitting the pressure from the pressure source 51 to the sealable, flexible element 60. The pressure changes the sealable, flexible element 60 to its deformed state which deploys the flow effector 20 by urging the blocks 24a, 24b toward the flow surface face 32. The pressure is such that the force on the base 26 from the sealable, flexible element 60 overcomes the biasing force of the biasing means 28 compressing it against the inside surface of the base plate 30. The vortex generators 22a, 22b extend from the flow surface face 32 through apertures 36 (not shown in FIG. 11). The flow effector 20 is, thereby, deployed into the fluid boundary layer flowing over the flow surface 10. In the deformed state the sealable, flexible element 60 seals against the chamber 38 walls to assure against the unintentional venting of pressure through the chamber 38. When the plenum 48 is depressurized through outlet port 56 by opening outlet orifice 54, or otherwise, the biasing means 28 urges the base 26 away from the flow surface face 32 returning the sealable, flexible element 60 to its quiescent state thereby retracting the flow effector 20 out of the fluid boundary layer as depicted in FIG. 10. While the flow effector 20 is shown as paired counter-rotating vortex generators in FIG.'s 10 and 11, a flow effector 20 in the form of a strake, turbulence producer, or vortex manipulator can also be deployed and retracted in the same manner.

Figure 12:
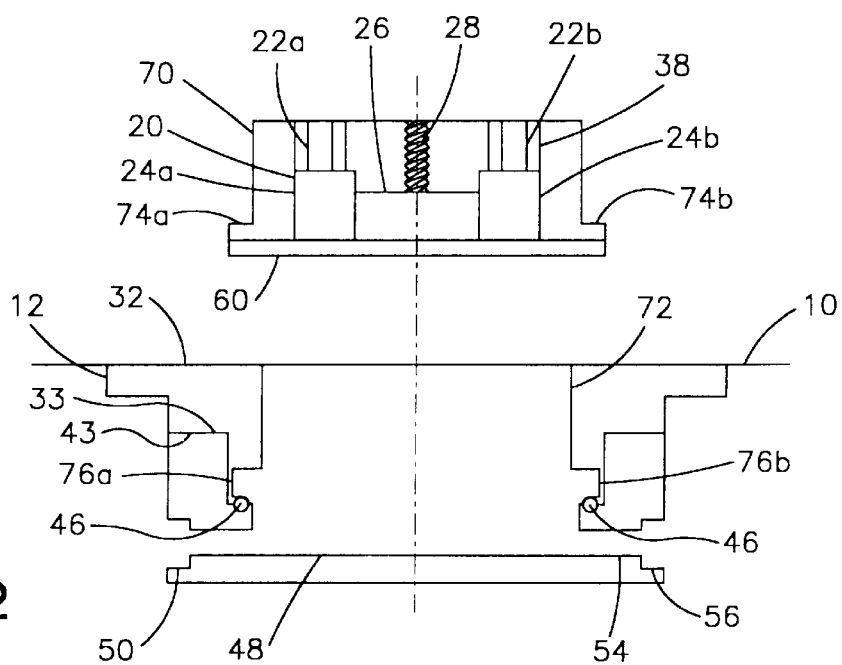
FIG. 12 is a detail of a flow effector in a modular sub-housing removably mounted in the housing.

Referring now to FIG. 12 there is shown a detail of the flow effector 20 located in a modular sub-housing 70 removably mounted in the housing 12. The modular sub-housing 70 locates in a sub-housing receptacle 72 in the housing 12. The modular sub-housing 70 can be removed from the housing 12 without removing the housing 12 from the flow surface 10. In this manner, a flow effector 20 can be removed and replaced in an easy and inexpensive manner by simply removing the modular sub-housing 70. The flow effector 20 can then be replaced or serviced as necessary and reused. Any appropriate means can be employed for removably mounting the modular sub-housing 70 in the sub-housing receptacle 72, such as screwing or by clip attachment. In FIG. 12, the modular sub-housing 70 is shown having side flanges 74a, 74b. In this design, the modular sub-housing 70 installs in the housing 12 by inserting it into the sub-housing receptacle 72 and then turning the modular sub-housing 70 until the side flanges 74a, 74b locate in flange slots 76a, 76b, respectively, sealing against sealing ring 46. The modular sub-housing 70 is removed from the housing 12 by turning the modular sub-housing 70 until the side flanges 74a, 74b dislocate from the flange slots 76a, 76b and lifting the modular sub-housing 70 out of the sub-housing receptacle 72.

Figure 13:
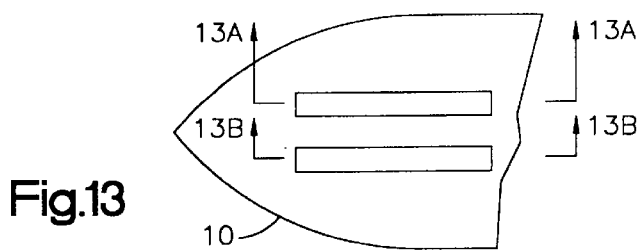
FIG. 13 is another view of a flow surface showing strakes as flow effectors.
Figure 13A:
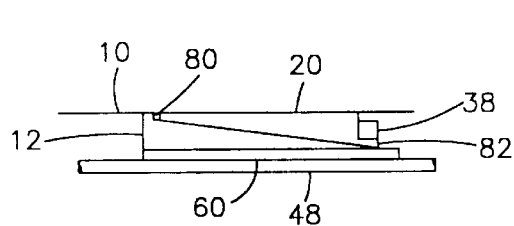
FIG. 13A is a view of the section cut along lines 13A—13A of FIG. 13.
Figure 13B:
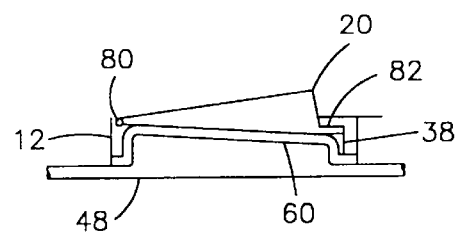
FIG. 13B is a view of the section cut along lines 13B–13B of FIG. 13.

Referring now to FIG. 13 there is shown a flow surface 10 with flow effector 20. In FIG. 13 the flow effector 20 is shown as strakes. FIG. 13A and FIG. 13B are section cuts of FIG. 13 along lines 13A—13A and 13B—13B, respectively. FIG. 13A shows the flow effector 20 retracted while FIG. 13B shows it deployed. The flow effector 20 is shown as wedged shaped with a hinged end 80. When pressure through plenum 48 forces the sealable, flexible element 60 to its deformed state, the flow effector 20 deploys into the fluid boundary layer by swinging up about hinged end 80.

The sealable, flexible element 60 seals against chamber 38. A stop 82 attached to the flow effector 20, prevents it from deploying on the flow surface 10 beyond a certain point. When the plenum 48 is not pressurized, the sealable, flexible element 60 returns to its quiescent state retracting the flow effector 20. The flow effector 20 retracts by swinging around hinged end 80 back into the housing 12.

Figure 14:
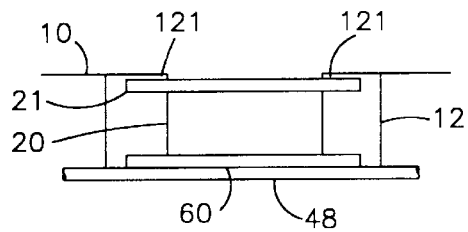
FIG. 14 is a detail of a flow effector with a flexible weatherproof cover.

Referring now to FIG. 14, there is shown a flow effector 20 with a flexible weather proof cover 21. The flexible weather proof cover 21 secures to the housing 12 under a lip 121 formed therein. The flexible weather proof cover 21 covers the flow effector 20 protecting it from the outside environment and weather, such as rain and snow, and, also isolating the inside of the housing 12 from such environment and weather. It expands, as necessary, to cover the flow effector 20. Since the flexible weather proof cover 21 is secured to the lip 121 of the housing 12, it continues to isolate the inside of the housing 12 from the outside environment and weather when the flow effector 20 is deployed.

Figure 15:
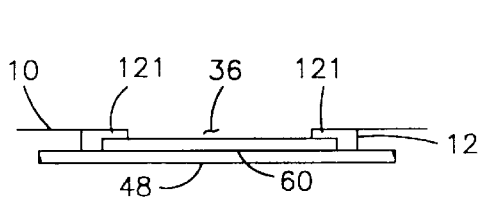
FIG. 15 is a view of the flow surface in which the sealable, flexible element is the flow effector attached under the flow surface and is shown in its quiescent state.
Figure 15A:
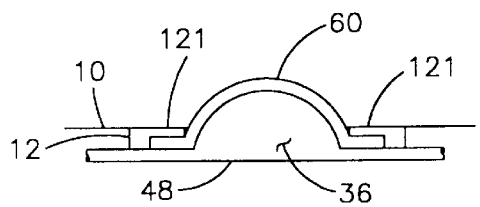
FIG. 15A is a view of the flow surface in which the sealable, flexible element is the flow effector of FIG. 15 and is shown in its deformed state.
Figure 16:
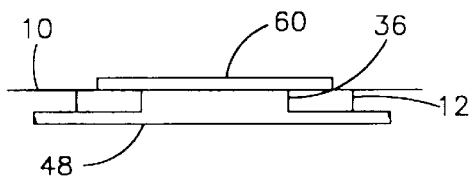
FIG. 16 is a view of the flow surface in which the sealable, flexible element is the flow effector attached to the flow surface and is shown in its quiescent state.
Figure 16A:
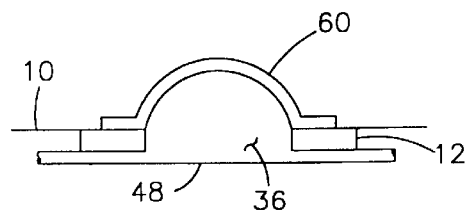
FIG. 16A is a view of the flow surface in which the sealable, flexible element is the flow effector of FIG. 16 and is shown in its deformed state.

Referring now to FIG.'s 15 and 16, there is shown another embodiment of the present invention, in which the sealable, flexible element 60 is the flow effector. FIG. 15 shows the sealable, flexible element in the quiescent state while FIG. 16 shows it in the deformed state. The sealable, flexible element 60 secures to the housing 12 under lip 121. When plenum 48 is not pressurized the sealable, flexible element 60 is in its quiescent state, retracted out of the fluid boundary layer on the flow surface 10 and within the housing 12. When the plenum 48 is pressurized, the sealable, flexible element 60 changes to its deformed state expanding such that it deploys through aperture 36 into the fluid boundary layer on the flow surface 10. When the plenum 48 is depressurized, the sealable, flexible element 60 returns to its quiescent state and retracts out of the fluid boundary layer on the flow surface 10. Aperture 36 can have any shape, such as circular, rectangular or triangular; preferably, rectangular or triangular shapes, which may be at an angle to the flow of fluid "F" such that the deformed state of the sealable, flexible element 60 causes vorticity in fluid "F".

FIG.'s 15A and 16A, show the sealable, flexible element 60 attached to the flow surface 10 instead of to the housing 12. Any suitable means for such attachment can be used, like a high strength adhesive. The sealable, flexible element 60 operates in the same manner as described with reference to FIG.'s 15 and 16 with the exception that the sealable, flexible element 60 does not expand through the aperture 36. The aperture 36 in FIG.'s 15A and 16A enables the transmission of pressure from the plenum 48 to the sealable, flexible element 60.

Accordingly, the deployable flow control device disclosed herein has a flow effector 20 which can be rapidly and repeatedly deployed into and retracted out of the fluid boundary layer on a flow surface 10 in all flow surface operating conditions. The flow effector 20, although light weight, has sufficient throw to control the dynamics of the fluid boundary layer and does not require peripheral equipment having excessive weight and power requirements. The housing 12 is retrofitably mountable on an operating flow surface 10, like the wing of an existing aircraft, and the flow effector 20 can be easily removed and serviced without requiring extensive downtime of the craft.

While the preferred embodiment of the invention has been shown and described, it will be apparent to those skilled in this art that various modifications may be made in this embodiment without departing from the teachings of the present invention.

What is claimed is:

1. A deployable flow control device for use with a flow surface over which fluid forming a fluid boundary layer flows and which said fluid boundary layer exhibits certain dynamics, comprising:
   a. a flow effector; and
   b. a sealable, flexible element having two elastic states defined as quiescent and deformed operably connected to said flow effector such that said flow effector is deployed into and retracted out of said fluid boundary layer flowing over said flow surface based upon the elastic state of said sealable, flexible element and whereby said flow effector controls said fluid boundary layer dynamics.

2. The deployable flow control device of claim 1 wherein said sealable, flexible element is made from polymer.

3. The deployable flow control device of claim 1 further comprising a weather proof cover which covers said flow effector and protects said flow effector from rain and snow.

4. A deployable flow control device for a flow surface over which fluid having a fluid boundary layer flows and which said fluid boundary layer exhibits certain dynamics, comprising:
   a. a pressure source;
   b. a sealable, flexible element having two elastic states, defined as quiescent and deformed, connected to said pressure source such that when pressure from said pressure source is applied to said sealable, flexible element said sealable, flexible element changes to said deformed state;
   c. biasing means which urges said sealable, flexible element to said quiescent state when pressure is removed from said sealable, flexible element; and
   d. a flow effector operably connected to said sealable flexible element such that said flow effector can be deployed into and retracted out of said fluid boundary layer flowing over said flow surface based upon said elastic state of said sealable, flexible element whereby said flow effector controls said fluid boundary layer dynamics.

5. The deployable flow control device of claim 4 wherein said sealable, flexible element is made from polymer.

6. The deployable flow control device of claim 4 wherein said pressure source is air bled from an aircraft turbine engine.

7. The deployable flow control device of claim 4 wherein said pressure source is a pressurized gas cartridge.

8. The deployable flow control device of claim 4 wherein said biasing means is a spring means.

9. The deployable flow control device of claim 4 wherein said biasing means is a vacuum means.

10. The deployable flow control device of claim 4 wherein said biasing means is a pressure means.

11. The deployable flow control device of claim 4 further comprising a weather proof cover which covers said flow effector and protects said flow effector from rain and snow.

12. A deployable flow control device for use with a flow surface over which fluid having a fluid boundary layer flows which said fluid boundary layer exhibits certain dynamics, comprising:
   a. a housing attachable to said flow surface;
   b. a flow effector movably attached to said housing; and
   c. deploying and retracting means operably connected to said flow effector such that said deploying and retracting means deploys and retracts said flow effector, from said housing, into and out of said fluid boundary layer flowing over said flow surface whereby said flow effector controls said fluid boundary layer dynamics.

13. The deployable flow control device of claim 12 wherein said housing is retrofitably attachable to said flow surface.

14. The deployable flow control device of claim 12 wherein said flow effector is mounted within said housing such that said flow effector can be removed and replaced without requiring removal of said housing from said flow surface.

15. The deployable flow control device of claim 12 further comprising a modular sub-housing removably attachable to said housing and in which said flow effector is positioned such that removal and replacement of said flow effector is affected by removing said sub-housing from said housing.

16. The deployable flow control device of claim 12 wherein said deploying and retracting means includes a sealable, flexible element.

17. The deployable flow control device of claim 12 wherein said deploying and retracting means includes pneumatic pressure.

18. The deployable flow control device of claim 12 wherein said deploying and retracting means includes hydraulic pressure.

19. The deployable flow control device of claim 12 wherein said deploying and retracting means includes biasing means.

20. The deployable flow control device of claim 12 wherein said deploying and retracting means includes a microelectromechanical device.

21. The deployable flow control device of claim 12 wherein said deploying and retracting means includes a mechanical device.

22. The deployable flow control device of claim 12 further comprising a weather proof cover which is secured to said housing and covers said flow effector such that said weather proof cover protects said flow effector from the outside environment and weather and isolates the inside of said housing.

23. A pressure responsive deployable flow control device for a flow surface over which fluid having a fluid boundary layer flows wherein said fluid boundary layer exhibits certain dynamics, comprising:
   a sealable, flexible element having two elastic states, defined as quiescent and deformed, said sealable, flexible element changing from said quiescent state to said deformed state in response to the application of pressure thereto deploying said sealable, flexible element into said fluid boundary layer on said flow surface to control said fluid boundary layer dynamics.

* * * * *